US009012341B2

(12) United States Patent
Rohr et al.

(10) Patent No.: US 9,012,341 B2
(45) Date of Patent: Apr. 21, 2015

(54) TREADMILL BELT WITH LAYER OF THERMOPLASTIC FOAMED MATERIAL

(75) Inventors: Stefan Rohr, Hochwald (CH); Marshall Wright, Röschenz (CH); Heinz Lüscher, Reinach (CH); Frank Otte, Kandern (DE); Edgar Von Gellhorn, Sins (CH)

(73) Assignee: Habasit AG, Reinach (CH)

( * ) Notice: Subject to any disclaimer, the term of this patent is extended or adjusted under 35 U.S.C. 154(b) by 993 days.

(21) Appl. No.: 12/532,079

(22) PCT Filed: Mar. 14, 2008

(86) PCT No.: PCT/CH2008/000109
§ 371 (c)(1),
(2), (4) Date: Sep. 18, 2009

(87) PCT Pub. No.: WO2008/113195
PCT Pub. Date: Sep. 25, 2008

(65) Prior Publication Data
US 2010/0035731 A1 Feb. 11, 2010

(30) Foreign Application Priority Data
Mar. 21, 2007 (CH) ........................................ 0456/07

(51) Int. Cl.
*B32B 5/24* (2006.01)
*A63B 22/02* (2006.01)
*B32B 5/02* (2006.01)
*B29D 29/00* (2006.01)

(52) U.S. Cl.
CPC ........... *A63B 22/02* (2013.01); *B32B 2305/022* (2013.01); *B32B 5/24* (2013.01); *B32B 5/024* (2013.01); *B32B 2305/188* (2013.01); *A63B 22/0285* (2013.01); *B29D 29/00* (2013.01)

(58) Field of Classification Search
CPC ................... B29K 2105/04; B29K 2105/0845; A63B 22/02; A63B 22/0285; A63B 2022/0207; B29C 65/00; B29C 65/48; B29L 2009/00; B32B 5/24; B32B 2038/0084; B32B 2305/18; B32B 2433/02; B32B 5/22; B32B 2305/02
USPC .............................. 442/221, 224, 226; 482/54
See application file for complete search history.

(56) References Cited

U.S. PATENT DOCUMENTS

| 5,332,080 A | 7/1994 | Lenhardt et al. |
| 5,708,060 A | 1/1998 | Sands et al. |
| 5,951,441 A | 9/1999 | Dalebout et al. |
| 2004/0132586 A1 | 7/2004 | Leighton et al. |
| 2006/0287147 A1 | 12/2006 | Kriesel |
| 2007/0298937 A1* | 12/2007 | Shah et al. ...................... 482/54 |

FOREIGN PATENT DOCUMENTS

EP 0695827 A2 2/1996

* cited by examiner

*Primary Examiner* — Jenna Johnson
(74) *Attorney, Agent, or Firm* — Hodgson Russ LLP

(57) ABSTRACT

Continuous treadmill belt comprising a continuous first foamed layer (11, 12, 13, 14, 15, 16, 17, 18) made of thermoplastic foamed material, with an upper side (25, 26) and an under side (34, 35, 36), wherein a first pulling body (41, 42, 43, 44, 46, 47, 48) is arranged on the under side (34, 35, 36) and comprises a first textile layer and a pulling body under side (54, 56, 58), and wherein no layer is arranged between the continuous foamed first layer (11, 12, 13, 14, 15, 16, 17, 18) and the first pulling body (41, 42, 43, 44, 46, 47, 48), which hinders a local shearing displacement of the first pulling body (41, 42, 43, 44, 46, 47, 48) parallel to the under side (34, 35, 36) or stiffens said pulling body.

12 Claims, 5 Drawing Sheets

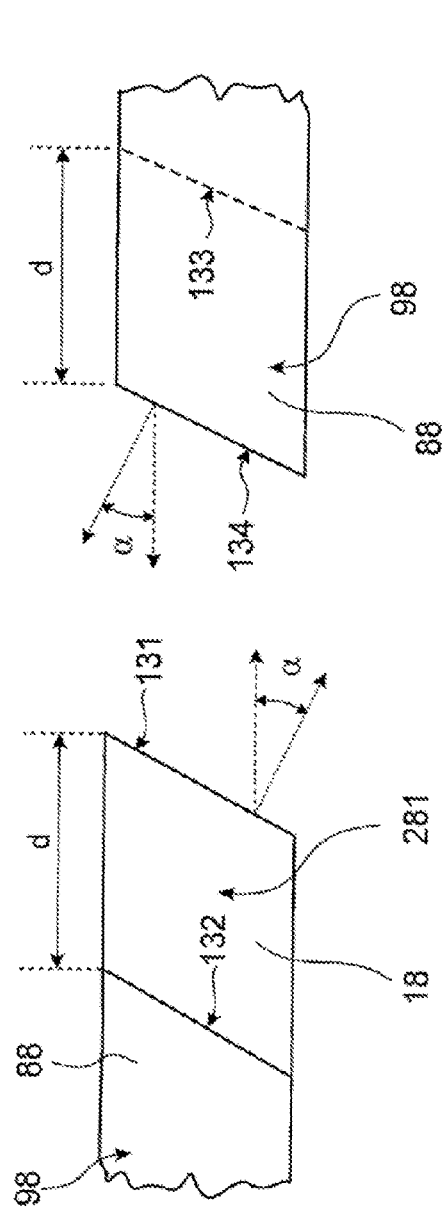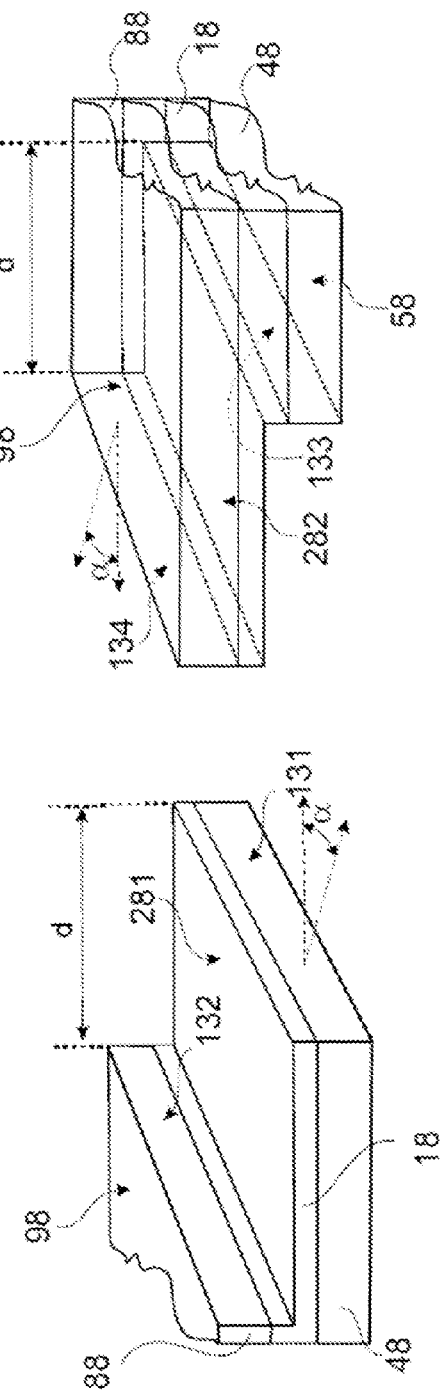
Fig. 8A
Fig. 8B

TREADMILL BELT WITH LAYER OF THERMOPLASTIC FOAMED MATERIAL

FIELD OF THE INVENTION

The present invention concerns exercise treadmill belts.

BACKGROUND OF THE INVENTION

Exercise treadmills are typically installed in fitness gyms. They make it possible for a user to perform a jogging or running training without requiring an outdoor running track. On the exercise treadmill, the user walks or runs on an endlessly revolving belt which can be motor driven at a freely selectable speed in order to simulate walking or running at different speeds.

U.S. Pat. No. 5,951,441 describes such an endless treadmill belt which includes, between a cushion layer and a woven fabric layer-containing base layer, a stabilizing layer which prevents localized shear displacement of the base layer in its plane and stiffens the base layer. The cushion layer may contain an organic compressible foam material, for example of neoprene, PVC foam or crosslinked polyethylene. The belt is made endless before the cushion layer is applied.

US-A-2006/0287147 describes a further endless treadmill belt which inter alia includes top and bottom layers, which may each consist of woven or non-woven material, and contains, between the top and bottom layers, a polymeric gel and a substrate which may consist of a foamed plastic. The belt is made endless by joining the ends of the top and bottom layers by welding (provided the material of these layers is fusible), or by means of additional adhesive or by mechanical joining such as stitching.

As stated, treadmill belts are endless. They should be made endless such that the joint is afterwards free of any unevennesses which are optically unsightly.

An end joint already used for treadmill belts which causes only insignificant unevennesses is the finger joint (see FIG. 4 of above-cited U.S. Pat. No. 5,951,441).

In the field of endless conveyor belts another form of end joint has been known, being referred to as a "step joint". In this joint, the ends are cut in the form of steps (the profile is step-shaped when the end is viewed from the side). The formation of the step increases, depending on the length of the step in the longitudinal direction of the belt, the adherable area of contact between the two ends and therefore the tenacity of the finished end joint; without formation of the steps only the end faces of the ends would be available as adherable areas (which are too small, since the belts are thin). A step joint may be made with an additional overlap of the ends, which further increases the adherable area of contact. In this case the step height has to be chosen as exactly half of the belt thickness, irrespective of the layered construction of the belt; otherwise, the ends can no longer be joined together properly. When the ends are joined together in such a manner with additional overlap, the conveyor belt initially has at the point of overlap, after joining the ends, an increased thickness amounting to 1.5 times the belt thickness. Simultaneously, upon joining these ends with additional overlap, a void is initially formed in the interior of the belt at the point of join. When the ends are bonded together, which is typically done under heat and pressure, the void is made to disappear again as the ends are pressed together; but the increased thickness at the two points of overlap can only be partially corrected back by laterally expelling excess material out of the conveyor belt, provided the material is ductile. After joining, therefore, a raised, optically unsightly bulge of material remains at the two points of overlap.

The present invention has the task to provide an endless treadmill belt which is simpler to make endless than the prior art treadmill belts and whose end joint is optically appealing.

SUMMARY OF THE INVENTION

This task is solved according to the present invention by an endless treadmill belt comprising an endless first foamed layer of a thermoplastic foam, having a top side and a bottom side, whereby on the bottom side is arranged a first traction layer comprising a first textile layer and a traction layer bottom side, and whereby between the endless foamed first layer and the first traction layer there is no layer which prevents localized shear displacement of the first traction layer parallel to the bottom side or which stiffens the first traction layer.

Preferred embodiments of the present invention will be apparent from the dependent claims. In particular it is preferred when the treadmill belt includes two traction layers, one on the bottom side of the first foamed layer and a second one on its top side.

It was surprisingly found that the ends of treadmill belts having the layered construction mentioned at the beginning, but with two traction layers as indicated above as preferred, can be adhered together by using the aforementioned step joint with an additional overlap by direct welding of the first foamed layer and/or by using the material of the foamed first layer as hotmelt adhesive, to obtain completely flat end joints without bulges of material. It is believed that, as the stepped ends are bonded together under heat and pressure, the thermoplastic foam of the first foamed layer is compressed at the two points of overlap to just such an extent that the increased thickness initially present at the points of overlap levels out with the treadmill belt thickness, without any need for lateral expelling of excess material. Also, by the use of a foamed first layer lower pressures and temperatures are required in order to produce the end joints with the stipulated evenness.

It was further found that treadmill belts of the type mentioned at the beginning, with only one traction layer, can be end-joined by using the finger joint without overlap, in which case—despite the aforementioned compressibility of the thermoplastic foam of the first foamed layer—no indentation is produced at the end joint, so that the end joint likewise is optically completely smooth.

It was further found for all types of the treadmill belt of the present invention that they do not need any layer between the first foamed layer and the first traction layer in order to prevent localized shear displacement of the first traction layer parallel to its bottom side, or in order to stiffen the first traction layer; and that they no longer require a separate, additional operation of making the traction layer or bodies themselves endless. It was similarly found for all types of the treadmill belt of the present invention that the thermoplastic foam does not expand in the course of the heating necessary for the end-joining, so that no bulges arise.

The treadmill belts of the present invention include an endless foamed first layer. This layer can be made endless, for example, by direct welding, or by using the material of the foamed layer as a hot-melt adhesive for bonding together, in which case optionally an additional adhesive, for example an additional hot-melt adhesive, may be co-used. Preferred is the welding or adhering without co-use of an additional adhesive. In these two preferred cases, the joint formed as the two ends are joined together to form the endless foamed layer consists of the same material as the thermoplastic foam.

For all layers of the treadmill belt of the present invention which include a thermoplastic foam, in particular for the first foamed layer, useful thermoplastics include for example: PA's such as PA 6, PA 11, PA 12, PA 66, PA 69, PA 610, PA 612, PA 6T, PA 6-3-T, PA MXD6, TPE-A's such as for example PEBA (polyether block amides, in particular here poly(poly{tetramethylene ethylene glycol}-b-poly{ω-laurolactam}), poly(poly{tetramethylene ethylene glycol}-b-poly{ε-caprolactam}), poly(polyethylene oxide-b-poly{ω-laurolactam}) and poly(polyethylene oxide-b-poly{ε-caprolactam}); PE's such as for example PET or PBT; TPE-E's such as for example poly(poly{tetradecakis[oxytetramethylene]oxyterephthaloyl}-b-poly{oxytetramethyleneoxy-terephthaloyl}); TPU's useful for producing soft foamed materials; TPE-U's, here in particular copolymers of polyester diols or polyether diols with diisocyanates, or TPE-U's based on polycarbonate. The polyester diol may be formed from adipic acid and butanediol; the polyether diol may be for example a polyaddition adduct of ethylene oxide and/or propylene oxide; and the diisocyanate may be in particular diphenylmethane 4,4'-diisocyanate. The TPE-U can also be a TPE-U based on polycarbonate. Further examples of thermoplastics are TPO such as for example polyethylene and copolymers of ethylene with a further olefinic monomer selected from $(C_3-C_{12})$-α-olefins (preferably $C_8$-α-olefins), vinyl acetate, styrene, $(C_1-C_4)$-alkyl acrylates and $(C_1-C_4)$-alkyl methacrylates; and PVC. Blends (i.e. mixtures) of the recited thermoplastics are also suited as the "thermoplastics", provided they are chemically compatible and miscible in the molten state. TPU's and PVC are particularly preferred.

The thermoplastics used according to the present invention can be non-crosslinked or partially crosslinked. The term "partially crosslinked" is to be understood as meaning that the degree of crosslinking is low enough for the thermoplastic to be nonetheless fusible, foamable and thermoplastically processible without decomposition. Preferably the thermoplastic is non-crosslinked. The thermoplastics useful for the present invention are thus not elastomers or thermosets. The thermoplastics may optionally have customary plasticizers added to them.

The foamed layers, in particular the foamed first layer, each contain a thermoplastic foam which consists preferably of at least 50 percent by weight, more preferably of at least 75 percent by weight, even more preferably of at least 90 percent by weight and yet even more preferably at least 95 percent by weight, based on the layer, of a thermoplastic as exemplified above, whereby the remainder of the layer being residual fractions of blowing agent, gas and optional further additives. Such additives are for example:
a) auxiliaries to improve the properties of the finished products such as for example UV and heat stabilizers; flame retardants; colorants; antibacterial or mold-killing additives; and
b) fillers as extenders to save plastics and thereby lower costs and/or for changing the electrical conductivity and dimensional stability and/or for reducing thermal expansion. In particular elongate or fibrous additives enhance strength.

It is preferred for the foamed first layer that it consists of a thermoplastic foam having a degree of foaming in the range from about 5 to about 60 percent, preferably in the range from about 10 to about 40 percent. In the context of the present invention the "degree of foaming" defines the volume fraction the gas bubbles contribute to the overall volume of the thermoplastic foam. The degree of foaming is very simple to determine via a measurement of the densities in the foamed and unfoamed state:

$$r = \frac{(\rho_u - \rho_g)}{\rho_u} \times 100$$

In this formula, r is the degree of foaming in percent, $\rho_u$ is the density of the unfoamed thermoplastic as a homogeneous mixture with all further facultative additives such as for example dyes, and $\rho_g$ is the density of an equal amount of the same thermoplastic mixture in the form of the blown foam.

The thickness of the first foamed layer is preferably in the range from about 0.1 to 1.0 mm and more preferably in the range from about 0.2 to 0.6 mm.

The treadmill belt of the present invention includes a first traction layer which is arranged on the bottom side of the first foamed layer and which contains or consists of a textile fabric. This textile fabric can be either a woven fabric or a knit fabric (for example a drawn-loop knit fabric or a formed-loop knit fabric); alternatively, it can also be a nonwoven fabric such as for example a fibrous nonwoven web or a laid scrim. Preferably, the first traction layer contains or consists of a woven fabric. Among woven fabrics, those having a plain construction or a twill construction are preferred. The warp threads of the woven fabric are preferably multifilaments of about 200 to 3300 dtex, more preferably about 500 to 1200 dtex. The weft threads may in one preferred embodiment likewise be multifilaments as exemplified for the warp threads; in another preferred embodiment they are monofilaments, typically with a diameter of about 0.15 to 0.6 mm and preferably about 0.25 to 0.4 mm. The material of the threads, yarns, fibers or ropes of the textile fabrics useful in the first traction layer preferably contains or consists of polyester, polyamide, cotton or polyethylene naphthalate; it can also contain or consist of a cotton/polyamide or cotton/polyester blend or a ternary mixture of cotton/polyamide/polyester. The textile fabric of the first traction layer can be embedded or encased in a plastic (for example a rubber or a thermoplastic as exemplified above for the first foamed layer).

The thickness of the first traction layer is preferably about 0.2 to 0.8 mm.

The bottom side of the first traction layer, generally the surface in contact with the rollers and the deck of the exercise treadmill, may be impregnated or coated with a customary lubricant in order to reduce friction. Examples of such lubricants are polydimethylsiloxane polymers, for example the "Dow Corning 200® Fluid" available from Dow Corning at the time of filing the present application. For impregnating the first traction layer in a continuous treadmill belt of the present invention with such lubricants, reference is made by way of example to U.S. Pat. No. 7,140,485.

The treadmill belt of the present invention optionally and preferably comprises a second traction layer, which is arranged on the top side of the foamed first layer. The indications regarding the constitution of the first traction layer are also applicable mutatis mutandis to the second traction layer, except that the textile fabric in the second traction layer is preferably either a woven fabric or a knit fabric, in particular a formed-loop knit fabric.

On top of the second traction layer, if is present, may preferably according to the present invention in turn be arranged a top layer which is composed of a thermoplastic material and which can be non-foamed or foamed as explained above. The thickness of this top layer is preferably about 0.1 to 1.0 mm. When this top layer is foamed, its foam may be other than or identical to the foam in the first foamed layer. Preferably, the top layer is also foamed.

The topmost layer of the treadmill belt of the present invention, which may be foamed or unfoamed, is typically the layer on which the user runs. It can be the abovementioned top layer; it can also be an additional covering layer arranged on top of the top layer. This topmost layer can optionally be provided on its top side with a profile, as customary in the art of treadmill belts, in order to prevent a slipping of the user. These profiles can be applied by embossing for example. The topmost layer (the top layer or the covering layer) may optionally also have antistatic properties. The latter can be achieved, as customary in the art, by admixing pulverulent, fibrous or fibrid-shaped electrically conductive materials (for example graphite, aluminum, silver, copper, nickel or polypyrrol) to the material of the topmost layer.

The layers of the treadmill belt of the present invention are arranged on top of each other. This means in the context of the present invention that the layers are bonded together either directly, for example by heat and pressure, or by co-use of an adhesive. When an adhesive is used, it is preferably selected from crosslinked polyurethane, rubber, rubber mixtures and phenol-formaldehyde resin. When the second traction layer contains or consists of a woven fabric, it is preferred that the second traction layer be arranged on the first foamed layer with the aid of an additional adhesive. However, when the second traction layer contains or consists of a laid scrim or a knit fabric, in particular a formed-loop knit fabric, it is preferred that the second traction layer be arranged on the first foamed layer without co-use of an additional adhesive, i.e. only through the action of heat and pressure.

The thicknesses of the individual layers of the treadmill belt can be determined either on the treadmill belt itself or after its separation into the individual layers (cutting open, milling off or detaching of layers). However, it may happen that one of the layers does not have a geometrically sufficiently clear shape. In this case, instead of the geometric thickness, the thickness h can be determined as the quotient of the weight per unit area of the layer, GL, (kg/m$^2$) and the mass-average density of all materials in the layer, $\rho$, (kg/m$^3$):

$$h = \frac{G_L}{\rho} = \frac{G_L}{\frac{\sum_{i=1}^{N} m_i \rho_i}{\sum_{i=1}^{N} m_i}}$$

where $m_i$ is the mass fraction of the i-th material of the layer and the summing is over all N materials occurring in the layer.

All the foamed layers of the treadmill belt of the present invention, in particular the foamed first layer, can be produced by foaming a thermoplastic material.

Foaming can firstly be carried out by direct admixture of a blowing agent to the thermoplastic material. The blowing agent may be a physical blowing agent. Examples of physical blowing agents are chlorofluorocarbons such as for example Frigen, Kaltron, Freon, Frigen, R11 and R12; hydrofluoroalkanes such as for example HFA 134 or HFA 227; and aliphatic linear, branched or cyclic ($C_4$-$C_8$)-hydrocarbons such as for example $C_5$-hydrocarbons (for example n-pentane, isopentane, neopentane, cyclopentane); $C_6$-hydrocarbons (for example n-hexane, isohexane, methylcyclopentane, cyclohexane), $C_7$-hydrocarbons (for example n-heptane, isoheptane, methylcyclohexane, cycloheptane) and $C_8$-hydrocarbons (for example octane, cyclooctane, isooctane, 1,2-, 1,3- or 1,4-dimethylcyclohexane). These hydrocarbons can be used in pure form or as hydrocarbon fractions of appropriately delimited boiling range, in which the respective hydrocarbons occur more or less dominantly (petroleum ether fractions). Further examples are blowing agents which are gaseous at room temperature, i.e. about 25° C., examples being $N_2$, $CO_2$, methane or argon; water; halogenated hydrocarbons such as for example dichloromethane, perchloroethylene and 1,1,1-trichloroethane; and low-boiling (i.e. boiling range about 60-100° C.) alcohols such as for example methanol, ethanol, propanol, isopropanol and tert-butanol. On the other hand, the blowing agent may also be a chemical blowing agent; chemical blowing agents only release the blowing gas, in particular nitrogen or carbon dioxide, upon heating.

Examples of useful chemical blowing agents are azo compounds, such as for example AIBN; hydrazine derivatives, such as for example benzenesulfonyl hydrazine; N-nitroso compounds; and easily decarboxylable carboxylic acids such as for example β-keto carboxylic acids. Physical blowing agents are preferred according to the present invention. The blowing agent is preferably selected such that it mixes very readily with the thermoplastic material to be foamed. This means that apolar thermoplastic materials, for example, an apolar blowing agent such as one of the above gaseous blowing agents or one of the above hydrocarbons or chlorofluorocarbons is used. On the other hand, water or one of the above alcohols can be used as a blowing agent for a more polar or hydrophilic thermoplastic. The amount of blowing agent is primarily determined by the desired degree of foaming. It may preferably be in the range from about 1 to about 10 percent by weight, based on the total amount of the thermoplastic to be foamed.

Foaming may secondly also be carried out by admixing so-called "expandable microspheres" to the thermoplastic material. Expandable microspheres have been known for a long time. They are formed by surrounding one of the above-exemplified, preferably physical blowing agents (in particular a water-insoluble blowing agent being liquid room temperature such as for example the abovementioned hydrocarbons, hydrofluoroalkanes or chlorofluorocarbons) by means of aqueous emulsion polymerization with a polymeric casing, for example of copolymer of acrylate/methacrylate and vinyl chloride. In the process, the blowing agent becomes encapsulated in the polymeric skin to form the said microspheres.

For the foaming it is preferred on the one hand that either the blowing agent be added in free form to the thermoplastic and the foaming be carried out using extrusion coating with simultaneous application to the first traction layer. It is preferred on the other hand to perform the foaming separately in an extruder, in which case the blowing agent is added in the form of the abovementioned expandable microspheres and the foamed first layer thus obtained is subsequently applied in a second operation to the first traction layer by calendering.

In an alternative process for producing the treadmill belt of the present invention which contains just one first traction layer (or for producing a corresponding intermediate), wherein the foam of the first foamed layer mainly, i.e., to an extent of at least about 50%, contains PVC as thermoplastic, the first step is to prepare a dispersion of the thermoplastic in a plasticizer, which dispersion also contains a blowing agent of the type and in amounts as described above. Useful plasticizers include for example phthalate plasticizers (e.g. dioctyl phthalate, diisoheptyl phthalate, di-2-ethylhexyl phthalate, diisooctyl phthalate, dicyclohexyl phthalate, benzyl butyl phthalate or mixed diesters of phthalic acid with $C_6$-$C_{11}$-alkanols, where the alkanol may be primary or secondary); phosphoric acid esters (e.g., tri-2-ethylhexyl phosphate, triheptyl phosphate or tri-2-ethylpentyl phosphate) or low-viscosity (i.e., preferably <1000 mPa·s at room temperature) polyesters, obtainable from $C_3$-$C_9$-dicarboxylic acids (for example malonic acid, 1,4-butanedioic acid, 1,5-pentanedioic acid, adipic acid, azelaic acid, suberic acid or sebacic acid) and $C_3$-$C_8$-alkanediols (for example 1,2-propylene glycol, 1,3-propylene glycol, 1,4-butanediol). The dispersion may optionally have added to it further additives such as stabilizers, pigments or fillers. Such a dispersion, apart from the blowing agent additionally present, is comparable to the dispersions known in the art as plastisols. In the case of this beforehand-prepared dispersion the amount and type of plasticizers is chosen such that the dispersion has a pasty consistency. This dispersion is applied uniformly, for example with a doctor blade or by means of a coating roll, to the top side of the first traction layer, and the applied layer is foamed up to the desired degree of foaming by heating.

After the bonding together of first foamed layer and first traction layer the optional further layers can be applied, likewise by calendering, extrusion coating or laminating. These methods are per se all known to the person skilled in the art.

The treadmill belt of the present invention is endless. To obtain this endless treadmill belt, a layered composite which already includes all required layers and traction layers (as described above) is, if necessary, firstly cut to a suitable length. The ends thus obtained could in principle be end-joined using any end joints known in the field of conveyor belts, examples being finger joints, wedge joints, overlap joints and step joints.

For treadmill belts of the present invention which only have a traction layer on the bottom side of the first foamed layer, however, the finger joint is preferred. The finger joint is already known in the field of treadmill belts (see above-cited U.S. Pat. No. 5,951,441), so that there is no need here for further discussion.

For treadmill belts of the present invention which have a traction layer on both the top side and the bottom side of the first foamed layer, however, the step joint described at the beginning and known in the field of conveyor belts is on the other hand preferred. The distance d by which the two end faces of one step of an end are offset relative to the other can typically be in the range from about 5 to 200 mm, if it is not zero; preferably, it is about 30 to 80 mm. It is more preferred that the step height is equal to half the belt thickness, so that the ends can overlap with an additional overlap x (in addition to the distance d) in the longitudinal direction of the layered body and yet be joined together gaplessly (see introduction). This additional distance x, if it is other than zero, can typically be in the range from about 2 to 200 mm; preferably it is in the range from about 2 to 10 mm. The four end faces needed for a step joint (two end faces per end, of which one end face is set back stepwise relative to the other end faces by said distance d) are preferably all planar and parallel to each other. The surface normals of these four planar end faces are preferably inclined relative to the longitudinal direction of the layered composite at an angle of inclination a, this angle of inclination lying in the plane of the bottom side of the foamed first layer. This angle of inclination a is typically in the range from about 10 to about 50 degrees, preferably about 20 to 40 degrees.

The knives or cutters needed for cutting the ends and the hot presses needed for the welding/adhering are customary in the art and require no further explanation.

With all kinds of end joints the ends are, after having the two ends brought together, bonded together by the action of heat and pressure. The thermoplastic foam of the foamed first layer can be used as a hot-melt adhesive, and/or an additional customary adhesive can be used. The ends are adhered and/or welded to each other. Preferably, the thermoplastic foam is used as hot-melt adhesive. It is more preferred not to use an additional adhesive, so that only the thermoplastic foam alone serves as adhesive.

BRIEF DESCRIPTION OF THE DRAWINGS

In the following the treadmill belt of the present invention and its production will now be described more in detail by means of illustrative embodiments with reference to the accompanying figures, of which

FIGS. 8, 9 show details of the ends and their joining for a step joint.

DETAILED DESCRIPTION OF THE INVENTION

Figure 1:
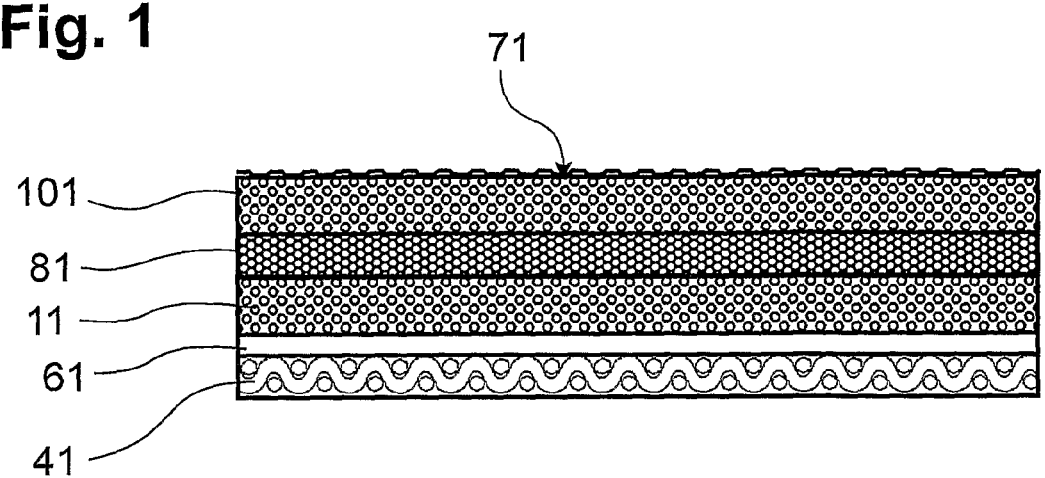
FIGS. 1,2,3,4 show four versions according to the present invention of the treadmill belt of the present invention.

The treadmill belt of FIG. 1 includes a first traction layer 41 which is arranged on the bottom side of the foamed first layer 11, and a second traction layer 81, which is arranged on the top side of the foamed first layer 11. The first traction layer 41 consists of a plain-woven fabric in which both the warp and the weft threads are multifilaments. The fiber material of the first traction layer 41 is a polyamide suitable for fibers; the warp threads may have 550 or 1100 dtex; the weft threads have 1100 dtex. The thickness of the first traction layer 41 is about 0.6 mm. The foamed first layer 11 consists of a foam of PVC having a degree of foaming of about 20%, the foaming having been brought about by means of expandable microspheres. The thickness of the first foamed layer 11 is about 0.4 mm. The first foamed layer 11 and the first traction layer 41 are adhered together by means of a thermosetting adhesive 61 (crosslinked polyurethane), for example by calendering. The second traction layer 81 consists of a warp-knitted fabric. The fiber material of the second traction layer 81 is a polyamide suitable for fibers and has a thickness of about 0.3 mm. The second traction layer 81 and the first foamed layer 11 are bonded together, for example by calendering, without use of an additional adhesive. The second traction layer 81 has arranged on it a top layer 101 of a foamed thermoplastic. This top layer 101 has the same chemical composition as the first foamed layer 11. This top layer 101 constitutes with its top layer top side 71 the running surface of the treadmill belt. The thickness of this top layer 101 is about 0.4 to about 0.8 mm, depending on the nature of the slip-reducing profile (indicated in the figure) formed on the top layer top side 71. The top layer 101 is secured to the second traction layer 81 without use of an additional adhesive, for example by calendering.

Figure 2:
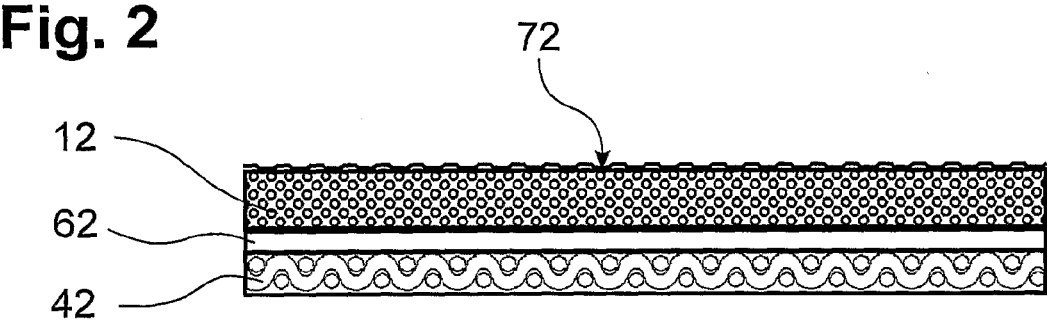

The treadmill belt of FIG. 2 includes only a first traction layer 42, which is arranged on the bottom side of the foamed first layer 12. This first traction layer 42 consists of a woven fabric having a twill weave, in which not only the warp but also the weft threads are multifilaments of 1100 dtex. The fiber material of the first traction layer 42 is of a polyester suitable for fibers. The thickness of the first traction layer 42 is about 0.6 mm. The foamed first layer 12 consists of a foam of an ethylene-1-octene copolymer produced by means of a "single site" catalyst; its degree of foaming is about 20%, the foaming having been brought about by means of a physical blowing agent (Freon). In this belt construction, the foamed first layer 12 is the topmost layer of the treadmill belt; its surface 72 has a suitable slip-reducing profile for this purpose. The thickness of the first foamed layer 12 is about 0.4 to about 0.8 mm, depending on the nature of this profile. The first foamed layer 12 and the first traction layer 42 are adhered together, for example by extrusion coating, by means of a thermosetting adhesive 62 (crosslinked rubber mixture).

Figure 3:
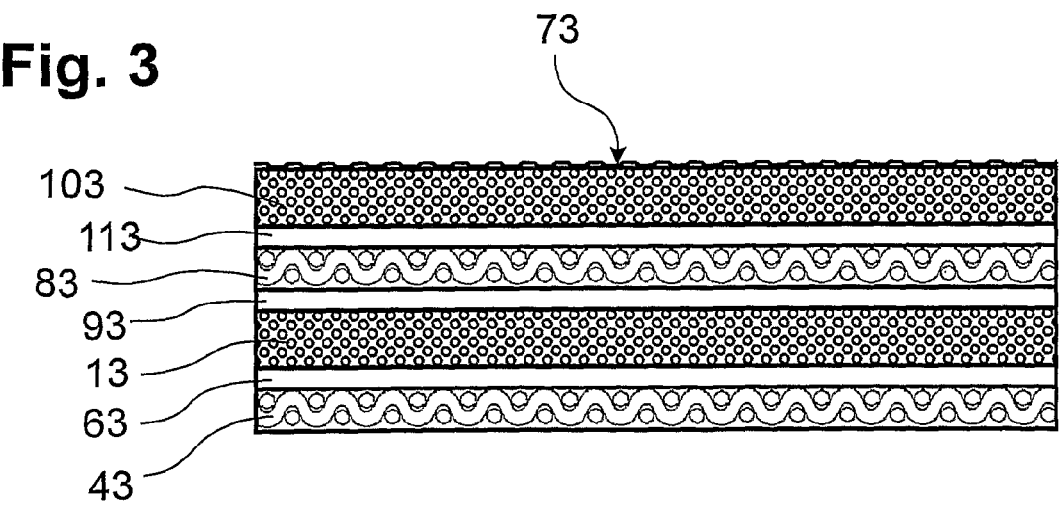

The treadmill belt of FIG. 3 includes a first traction layer 43, which is arranged on the bottom side of the foamed first layer 13, and a second traction layer 83, which is arranged on the top side of the foamed first layer 13. The first traction layer 43 consists of a woven fabric having a twill weave, in which the warp threads are multifilaments of 1000 dtex and the weft threads are monofilaments of 0.25 mm diameter. The fiber material of the first traction layer 43 is of cotton. The thickness of the first traction layer 43 is about 0.6 mm. The foamed first layer 13 consists of a TPU foam having a degree of foaming of about 20%, the foaming having been brought about by means of expandable microspheres. The thickness of the first foamed layer 13 is about 0.35 mm. The first foamed layer 13 and the first traction layer 43 are adhered together, for example by calendering, by means of a thermosetting adhesive 63 (crosslinked polyurethane). The second traction layer 83 consists of a plain-woven fabric in which the warp threads are multifilaments of 1000 dtex and the weft threads are monofilaments of 0.25 mm diameter. The fiber material of the second traction layer 83 is also cotton. The thickness of the second traction layer is about 0.6 mm. The second traction layer 83 and the first foamed layer 13 are bonded together, for example by calendering, using a thermosetting adhesive 113 (crosslinked polyurethane). The second traction layer 83 has a foamed thermoplastic top layer 103 arranged atop on it which is identical to the top layer of FIG. 1 and which again is bonded to the second traction layer 83, for example by calendering, using a thermosetting adhesive 93 (crosslinked polyurethane).

Figure 4:
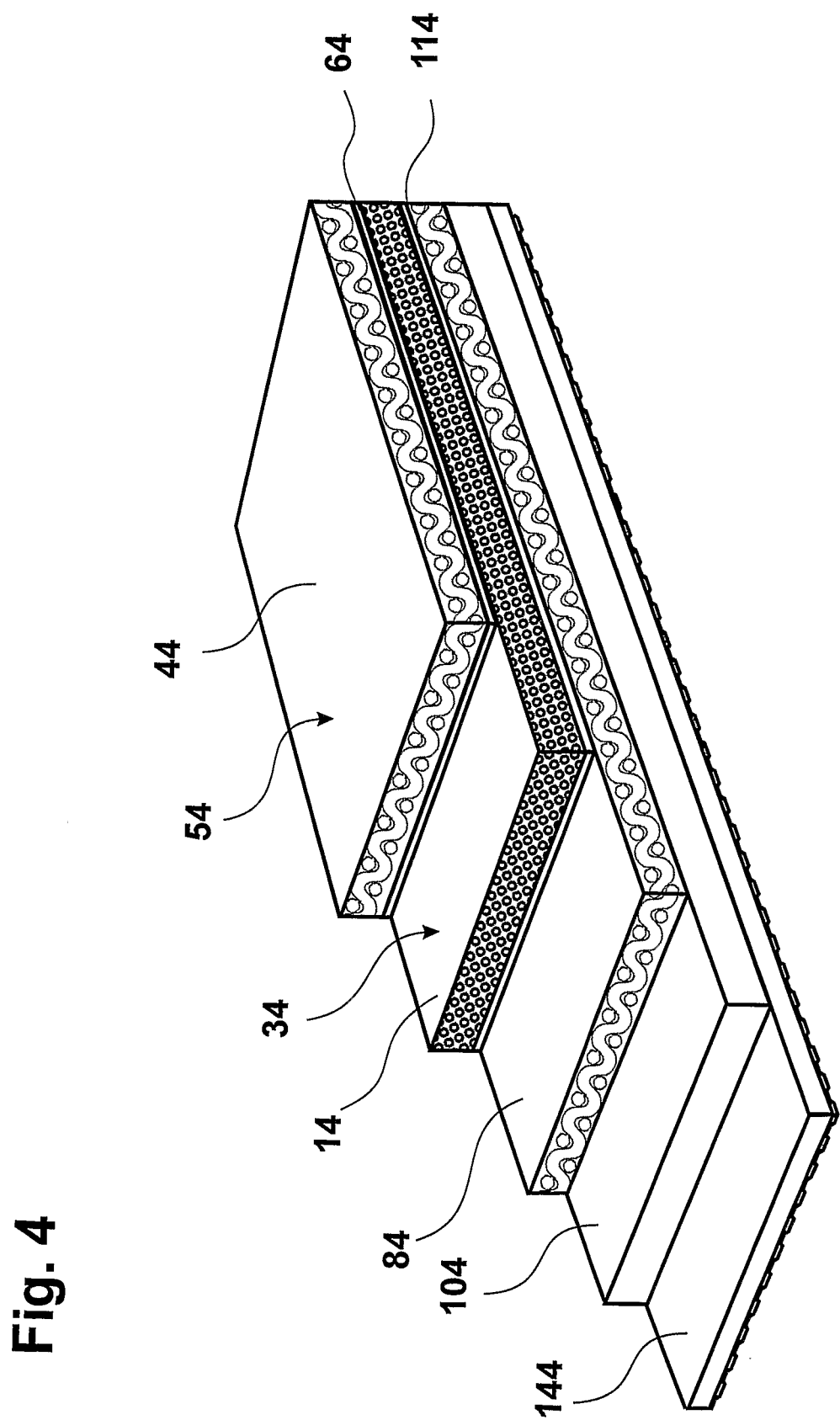

The treadmill belt of FIG. 4 is shown from below, so that the bottom side 34 of the first foamed layer 14 is visible. The construction of this treadmill belt is identical to the construction of the treadmill belt of FIG. 3, except that the top layer 104 (which now is no longer profiled) has arranged on it an additional profiled thin, antistatic covering layer 144 of TPU mixed with graphite powder.

Figure 5:
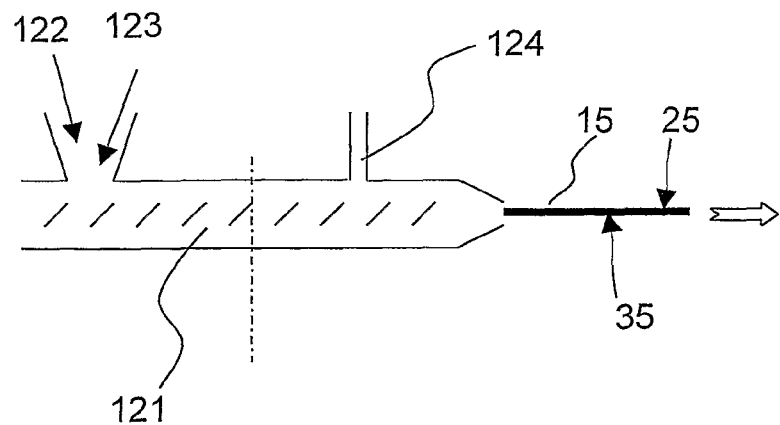
FIG. 5 shows a schematic view of an extruder useful for the production of the thermoplastic foams.
Figure 6:
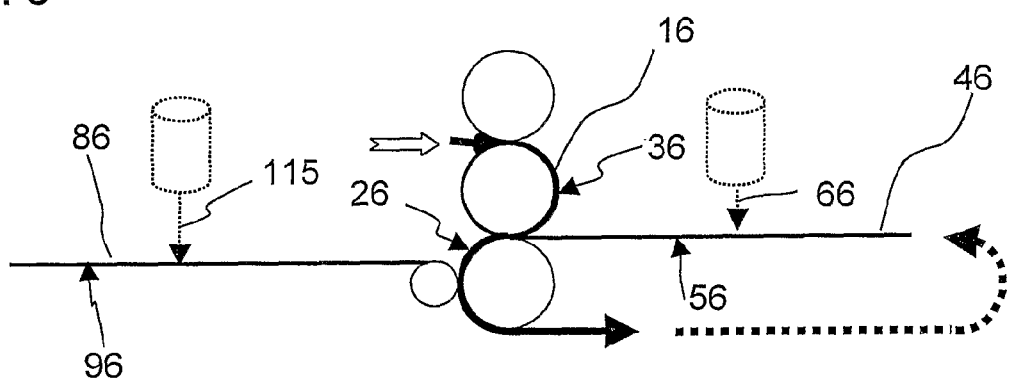
FIG. 6 shows schematically the production of a treadmill belt of the present invention from a first foamed layer and a first traction layer by calendering and the subsequent addition of a second traction layer, also by calendering.
Figure 7:
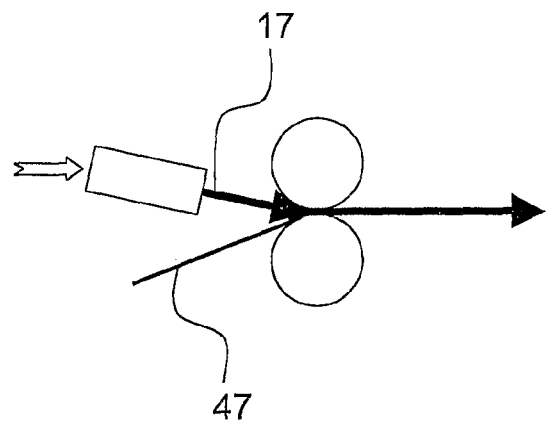
FIG. 7 shows schematically the production of a treadmill belt of the present invention from a first foamed layer and a first traction layer by extrusion coating.

FIGS. 5-7 illustrate schematically the production of the layered composite which forms the not yet endless treadmill belt.

FIG. 5 shows the production of a foamed first layer 15 itself in an extruder 121: The granulated or ground, still unfoamed thermoplastic 122 is mixed in the extruder 121 with optional further additives 123, such as for example dyes, fillers or flame inhibitors. When the blowing agent is easy to meter, when it is solid for example, it can be added together with the thermoplastic 122 and the additives 123. When the blowing agent is gaseous or liquid, it can be introduced into the extruder 121 directly and separately via a feed line 124. This mixture of all constituents is sufficiently heated and pressurized for the blowing agent to become commixed with the already molten mixture. In some cases, the commixing can be carried out such that the blowing agent is converted into the supercritical state. The resulting mixture of thermoplastic 122 and blowing agent is foamed up in the extruder 121 and removed from the extruder 121, for example via a round die, as a thermoplastic foam (indicated as outline arrow in FIG. 5). When a slot die is used, the foam can be produced directly as first foamed layer 15 having a top side 25 and a bottom side 35.

FIG. 6 shows schematically the calendering of two traction layers 46 and 86 onto the bottom side 36 and the top side 26, respectively, of a first foamed layer 16. Either a first foamed layer 16 or else a relatively shapeless thermoplastic foam can be used, since the calender rolls dictate the final shape of the first foamed layer 16. Initially, a first traction layer 46 is calendered onto the bottom side 36 of the first foamed layer 16. When an additional adhesive 66 is needed to bond the first foamed layer 16 and the first traction layer 46 together, it can be applied to the top side of the traction layer by sprinkling in the form of a pulverulent resin or by spraying in the form of a solution in a solvent or by means of a doctor blade before the traction layer 46 enters the pair of rolls. The figure also shows how a second traction layer 86 is calendered onto the top side 26 of the first foamed layer 16 immediately subsequently. Here too an additional adhesive 115 could optionally be sprinkled or sprayed onto the bottom side of the second traction layer 86. What is further shown in the form of the thick broken-lined arrow is that the layered composite obtained could optionally be coated with further layers: In that case the already existing layered composite would be fed to the calender from the right instead of the first traction layer 46 and the further layer in question would be fed from the left instead of the second traction layer 86. Depending on the orientation as to how the already existing layered composite was fed into the calender, this further layer would come to be disposed underneath the first traction layer or on top of the second traction layer.

FIG. 7 shows schematically an extrusion-coating of a first traction layer 47 with a foamed first layer 17. Initially, a thermoplastic foam is extruded similarly as described for FIG. 5, by preferred use of chemical or physical blowing agents, whereby however no slot die is required.

Figure 9A:
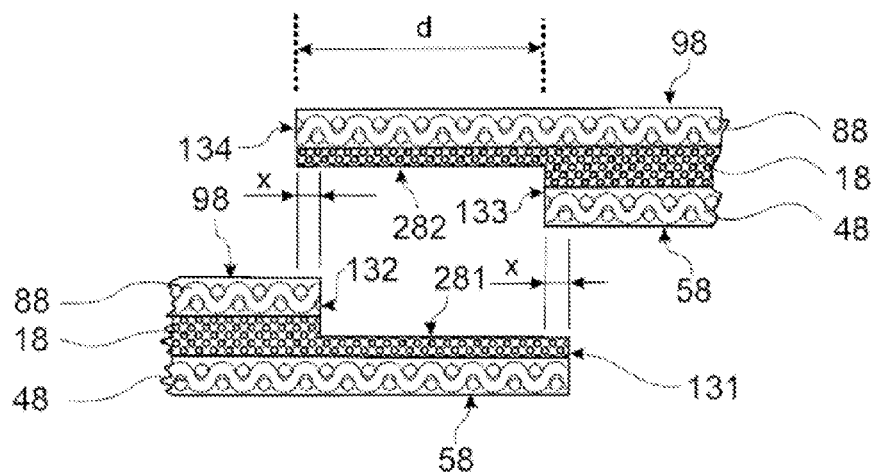
Figure 9B:
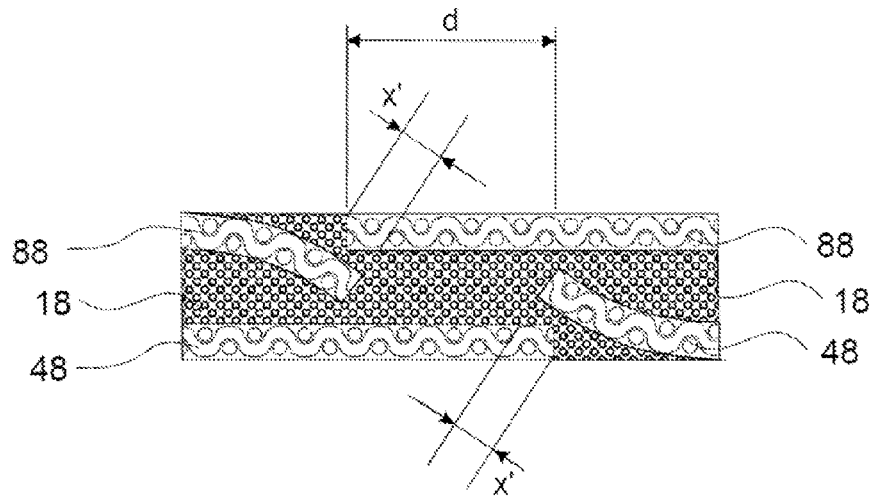

FIGS. 8 and 9 illustrate the joining into an endless form of a finished layered composite (i.e. of a treadmill belt which has not yet been made endless) which includes a first foamed layer 18 and two traction layers 48, 88, the end joint being a step joint. Still further layers could be present in particular atop of the second traction layer 88, but these are not depicted in FIGS. 8 and 9.

The layered composite shown in FIGS. 8A (top view) and 8B (perspective view) is initially cut to a desired length, so that a planar first end face 131 is formed at one end and a planar second end face 134 at the other. These two end faces 131, 134 are beveled such that their surface normals (drawn as short-dashed arrows) are inclined by an angle α of about 30° relative to the longitudinal direction of the layered composite (indicated as long-dashed arrows) and in parallel to the bottom side of the first foamed layer 18 (i.e. in the plane of the sheet). The layered composite is then cut open at both ends up to a distance d in the longitudinal direction, with a knife for example, such that the first foamed layer 18 is severed at half the belt thickness to form a first separation surface 281 and a second separation surface 282 (FIGS. 8A, 8B, and 9A). At the end shown at left the second traction layer 88 (and also any optional, thermoplastic foamed or unfoamed layers that might be situated above the second traction layer and not shown in FIGS. 8 and 9) and the first foamed layer 18 are then cut through perpendicularly and offset backwards by a distance d from the end face 131, so as to form a first set-back end face 132 which extends parallel to the first end face 131 and which is offset backwards from the latter by a distance d, with formation of a step. At the other end, the first foamed layer 18, the first traction layer 48 (and also any optional layers that might be situated underneath the first traction layer and not shown in FIGS. 8A, 8B, and 9A) are cut through perpendicularly and offset backwards from the end face 134 by the same distance d, such as to form a second set-back end face 133 which extends parallel to the second end face 134 and which is offset backwards from the latter by a distance d, with formation of a step. The second set-back end face 133 is shown in FIGS. 8A and 8B only with broken lines. The end shown at the left includes a step formed by the first set-back end face 132, the first separation surface 281 and the first end face 131; the end shown at right includes a step formed by the second end face 134, the second separation surface 282 and the second set-back end face 133.

The two ends are then placed on top of each other so as to overlap by an additional distance x of about 5 mm (FIG. 9). The first set-back end face 132, the first separation surface 281, the second separation surface 282 and the second set-back end face 133 form a void in the interior of the belt. The ends thus joined together are welded together (i.e. in the present case without use of an additional adhesive) by means of a hot press. The thermoplastic foam at the first separation surface 281 fuses together with the thermoplastic foam at the second separation surface 282. Furthermore, a portion of the thermoplastic foam on the first separation surface 281 fuses together with the bottom side of the treadmill belt end shown at right in FIG. 9 (this bottom side is here in fact the traction layer bottom side 58, since there are no further layers arranged underneath the first traction layer 48). Furthermore, a portion of the thermoplastic foam on the second separation surface 282 fuses together with the running surface of the treadmill belt end shown at left in FIG. 9 (this running surface here is in fact the traction layer upper side 98, since there are no further layers arranged above the second traction layer 88). This fusing gives an endless first foamed layer 18.

The treadmill belt of the present invention is useful in all conventional exercise treadmills. Exercise treadmills comprising the treadmill belt of the present invention likewise are also an object of the present invention.

The invention claimed is:

1. An endless treadmill belt comprising:
   an endless layered composite, including:
   a) a first foamed layer (11, 12, 13, 14, 15, 16, 17, 18) of a thermoplastic foam and having a top side (25, 26) and a bottom side (34, 35, 36); and
   b) a first traction layer (41, 42, 43, 44, 46, 47, 48) comprising a woven fabric and having a traction layer bottom side (54, 56, 58) which forms a surface able to come into contact with rollers or a deck of an exercise treadmill;
   wherein the first traction layer (41, 42, 43, 44, 46, 47, 48) is adhered to the bottom side (34, 36) by a crosslinked adhesive (61, 62, 63, 64, 66);
   whereby the layered composite is made endless by only making the first foamed layer (11, 12, 13, 14, 15, 16, 17, 18) endless by direct welding using the material of the first foamed layer as a hot-melt adhesive, and without using any other adhesive.

2. The treadmill belt according to claim 1 wherein the first traction layer (41, 42, 43, 44, 46, 47, 48) consists of one of the following: a woven fabric, or a woven fabric and a lubricant coated onto or impregnated into the woven fabric bottom side (54, 56, 58).

3. The treadmill belt according to claim 1 wherein the first foamed layer (12) has a profiled running surface (72).

4. The treadmill belt according to claim 1, wherein the layered composite further comprises a second traction layer (81, 83, 84, 86, 88) arranged on the top side (26), said second traction layer (81, 83, 84, 86, 88) comprising a woven fabric and having a traction layer top side (96, 98) and being adhered to the top side (26) by a crosslinked adhesive (113, 114, 115).

5. The treadmill belt according to claim 4 wherein on the traction layer top side (96, 98) of the second traction layer (81, 83) there is arranged a thermoplastic top layer (101, 103) with a profiled running surface (71, 73).

6. The treadmill belt according to claim 5 wherein the top layer (101, 103) is foamed.

7. The treadmill belt according to claim 1 wherein the thermoplastic foam of the endless foamed first layer (11, 12, 13, 14, 15, 16, 17, 18) contains at least 50 percent by weight, preferably at least 75 percent by weight, more preferably at least 90 percent by weight and particularly preferably at least 95 percent by weight, based on the foamed first layer (11, 12, 13, 14, 15, 16, 17, 18), of a thermoplastic.

8. The treadmill belt according to claim 7 wherein the thermoplastic is selected from the group consisting of PA's, TPE-A's, TPU's, TPE-U's, PVC, TPO's, PE's and TPE-E's.

9. The treadmill belt according to claim 7 wherein the thermoplastic is a TPU or PVC.

10. The treadmill belt according to claim 1 wherein the thermoplastic foam of the endless first foamed layer (11, 12, 13, 14, 15, 16, 17, 18) has a degree of foaming in the range from 5 to 60 percent and preferably in the range from 10 to 40 percent.

11. An exercise treadmill comprising an endless treadmill belt according to claim 1.

12. The treadmill belt according to claim 4 wherein on the traction layer top side (96, 98) of the second traction layer (81, 83) there is arranged a foamed thermoplastic top layer (104), and on top of said foamed thermoplastic top layer (104) is arranged a profiled top layer (144) having antistatic properties.

* * * * *